(12) United States Patent
Edwards

(10) Patent No.: US 6,643,975 B1
(45) Date of Patent: Nov. 11, 2003

(54) FISH ATTRACTOR

(76) Inventor: Michael J. Edwards, 3779 Brussels St., North Bend, OR (US) 97459

( * ) Notice: Subject to any disclaimer, the term of this patent is extended or adjusted under 35 U.S.C. 154(b) by 0 days.

(21) Appl. No.: 10/293,696

(22) Filed: Nov. 12, 2002

(51) Int. Cl.$^7$ .......................... A01K 85/01; A01K 85/14
(52) U.S. Cl. ..................... 43/42.31; 43/45.51; 43/42.33
(58) Field of Search ................ 43/42.5, 42.51, 43/42.31, 42.32, 42.33, 42.34, 43.1, 43.13, 42.06

(56) References Cited

U.S. PATENT DOCUMENTS

| | | | | |
|---|---|---|---|---|
| 967,660 A | * | 8/1910 | Pedersen | 43/42.34 |
| 1,546,673 A | * | 7/1925 | Poulsen | 43/42.34 |
| 1,596,103 A | * | 8/1926 | James | 43/42.34 |
| 1,946,641 A | * | 2/1934 | Sisco | 43/42.31 |
| 2,235,905 A | * | 3/1941 | Sherwood | 43/42.51 |
| 2,517,495 A | * | 8/1950 | Kneece | 43/42.06 |
| 2,522,725 A | * | 9/1950 | Schiffmann | 43/42.5 |
| 2,728,160 A | * | 12/1955 | Franklin | 43/42.5 |
| 2,758,408 A | * | 8/1956 | Murphy et al. | 43/42.5 |
| 2,787,860 A | * | 4/1957 | Carr | 43/42.5 |
| 2,797,520 A | * | 7/1957 | Nycz et al. | 43/42.06 |
| 3,091,049 A | * | 5/1963 | Reimers | 43/42.5 |
| D200,320 S | * | 2/1965 | Grant | D22/131 |
| 3,169,337 A | * | 2/1965 | McGregor | 43/42.52 |
| 3,289,345 A | * | 12/1966 | Reininger et al. | 43/42.32 |
| 3,413,750 A | * | 12/1968 | Henry | 43/42.33 |
| D222,353 S | * | 10/1971 | Mills | 43/42.5 |
| 3,834,058 A | * | 9/1974 | Gaunt | 43/42.32 |
| D235,867 S | * | 7/1975 | Williams, Jr. | D22/131 |
| 4,122,624 A | * | 10/1978 | Smith | 43/42.33 |
| 4,637,160 A | * | 1/1987 | Biskup | 43/42.33 |
| 4,735,012 A | * | 4/1988 | Smith et al. | 43/42.51 |
| 4,839,983 A | * | 6/1989 | Pippert | 43/42.06 |
| D333,861 S | * | 3/1993 | Keranen | D22/219 |
| D356,850 S | * | 3/1995 | Hoffpauir | D22/129 |
| D363,113 S | * | 10/1995 | Hazelquist | D22/129 |
| D374,907 S | * | 10/1996 | Ketchum | D22/129 |
| 5,970,648 A | * | 10/1999 | DeRose | 43/42.33 |
| D435,628 S | * | 12/2000 | Lester | D22/129 |
| 6,493,984 B1 | * | 12/2002 | Bechhold | 43/42.51 |
| D472,955 S | * | 4/2003 | Hyneman | D22/129 |

FOREIGN PATENT DOCUMENTS

| | | | | |
|---|---|---|---|---|
| AU | 219551 B1 | * | 1/1959 | 43/42.51 |
| CA | 2112550 B1 | * | 6/1995 | |
| CA | 2243693 B1 | * | 1/2000 | |
| DE | 179132 B1 | * | 7/1954 | 43/42.5 |
| DE | 3718968 B1 | * | 12/1988 | |
| DE | 19936914 B1 | * | 9/2001 | |
| FR | 2342026 B1 | * | 10/1977 | |

OTHER PUBLICATIONS

Photograph of "Fish Flash" ® no drag flasher and Information Sheet sold therewith.

Photograph of a stainless steel fish attractor publicly used by Michael J. Edwards and others during the period 1980–1984.

Photograph of another stainless steel fish attractor publicly used by Michael J. Edwards and others during the period 1980–1984.

* cited by examiner

*Primary Examiner*—Darren W. Ark
(74) *Attorney, Agent, or Firm*—Karquist Sparkman, LLP

(57) ABSTRACT

A fish attractor made of transparent plastic has a triangular body having an aperture at the apex and one centrally located in the base, a substantially larger circular opening positioned centrally in the plane of transparent plastic, layers of holographic tape adhered to the sides of the attractor, the layers having circular openings therein corresponding in size to the opening in the transparent plastic, and a circular piece of plastic film larger in diameter than the circular openings in the layers of holographic tape and adhered to one of the layers of holographic tape such that the piece of plastic film is sandwiched between the plane of transparent plastic and the one layer of holographic tape, the piece of plastic film being stretched to provide a dome that vibrates and produces noise as the attractor moves through water.

9 Claims, 1 Drawing Sheet

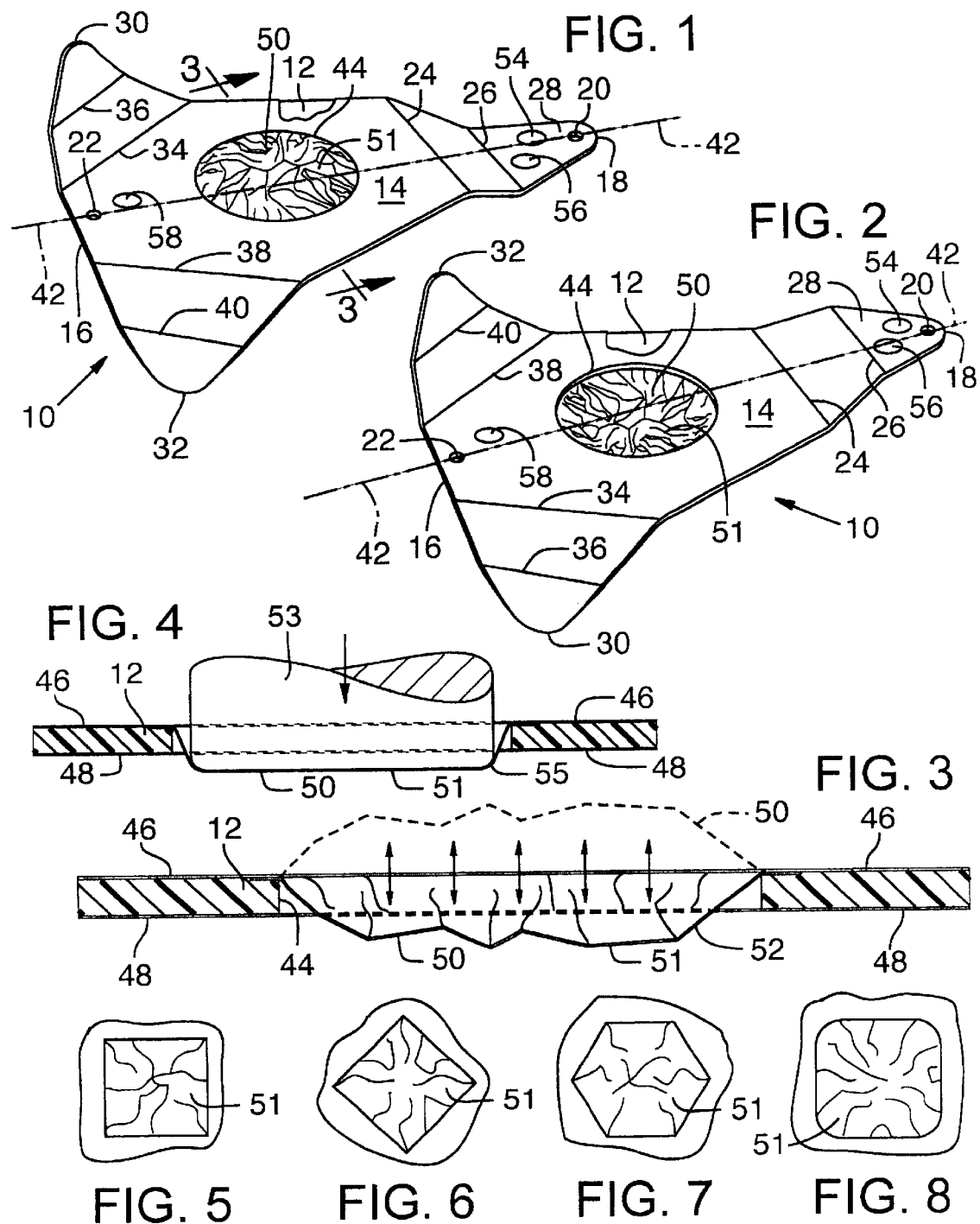

FISH ATTRACTOR

FIELD OF THE INVENTION

My invention relates to fish attractors and lures, and more particularly, to fish attractors and lures adapted to rotate, flash or otherwise attract fish when drawn through water.

BACKGROUND OF THE INVENTION

I have been a fisherman almost all my life.

Prior to 1984 I worked as a sheet metal journeyman where I had access to left over or scrap material that I could use to make my own fishing lures. I started making flashers or lures sometime between 1980 and 1984. I used polished stainless steel during that time. However, my career as a sheet metal worker ended on Mar. 12, 1984, when I became disabled as a result of an industrial accident.

I still have two of the early stainless steel models that I made before I was disabled. These two were among others that I used publicly and gave to fishermen friends. Each of them had a generally triangular planar body portion. The body portions each had an apex and a base. An aperture was positioned centrally of the apex for attachment to the end of a fishing line. A second aperture was positioned generally centrally of the base for attachment to a fishing hook.

In each case the apex portion of the body portion was bent. A first bend bent the body portion out of its plane. A second bend bent the end of the apex portion into a second plane parallel to the plane of the body portion. These two bends provided a longitudinal oscillatory motion to the attractors along their longitudinal axes as the attractors were pulled through the water.

In addition, I bent each of the opposite ends of the base out of the plane of the body portion, bending the ends in opposite directions to provide a vane at each of the opposite ends. The vanes rotated the attractors about their longitudinal axes as they were pulled through the water.

One of the early attractors had three three-quarter inch diameter holes cut along its longitudinal axis to provide sound as the attractor was pulled through the water. The other of the early attractors had a one-inch diameter hole cut on its longitudinal axis. The stainless steel provided the attractors with a good shine, but I wasn't satisfied with the sound that the holes provided.

The stainless steel also made the attractors heavy. This was good for ocean fishing because the weight kept the attractors down deep. However, for river fishing or fishing in shallower waters, the attractors simply weighed too much.

Also, special equipment was required to make the required bends, and a laser was required to cut the holes. This was expensive.

I then experimented with various kinds of plastic. I was looking for a material that was inexpensive and light so I could fish in shallower waters. Also, I wanted a plastic material that wasn't brittle so that heat would not be needed to bend it.

My final challenge was to improve the noise that the attractor would make as it was pulled through the water. A one and three-quarter or two-inch hole in the center of a plastic body portion gave an attractor a sporadic spinning action and a very open, circular roll, but the hole alone would not provide any discernable noise. Adequate noise was something that had to be achieved.

The patent prior art is replete with designs for lures and attractors. None, however, discloses noise-making ability.

One of the prior patents is U.S. Pat. No. Des. 363,113, issued Oct. 10, 1995 to Al E. Hazelquist. The Hazelquist design uses a generally triangular body portion. Apertures are provided at the center of the apex and in the center of the base. In addition, each of the opposite ends of the base is bent out of the plane of the body in opposite directions to provide the attractor with a rotational motion as it is pulled through the water.

A commercial embodiment of the Hazelquist attractor appears to replicate identically the fish attractor shown in FIG. 1 of the '113 design patent. The embodiment is sold by Big Al's Tackle Company, Gig Harbor, Wash., as the Fish Flash® no drag flasher. This commercial embodiment is made of transparent plastic and has holographic tape adhered to one side to provide a flashing appearance.

It was thus the principal object of my invention to improve upon the prior art, including the flashers that I myself had made and used throughout the years. In particular, it was my object to provide my flashers with the ability to produce adequate noise as they rotated and were moved through the water.

BRIEF DESCRIPTION OF THE DRAWINGS

FIG. 1 is a perspective view of one side of my new fish attractor.

FIG. 2 is a perspective view of the opposite side of the attractor shown in FIG. 1.

FIG. 3 is a cross sectional view to an enlarged scale taken on line 3—3 of FIG. 1 and illustrating in dashed lines the amplitude of transverse movement of the sound producing mechanism of the invention.

FIG. 4 is a schematic illustration of a means of stretching the film that produces the sound.

FIGS. 5–8 are plan views of different shape openings that can be used instead of the circular opening shown in the center of FIGS. 1 and 2.

DETAILED DESCRIPTION

My fish attractor 10 has a generally triangular planar body portion 12 that comprises a first plane 14. Body portion 12 is desirably made in two sizes, one that is seven and one-half inches long and about five inches across at the base; and another that is five and one-half inches long, and about four and one-quarter inches across at the base. Body portion 12, being generally triangular, has a base 16 and an apex 18. A one-eighth inch diameter first aperture 20 is provided in the center of apex 18 to enable attractor 10 to be attached to the end of a fishing line (not shown). A one-eighth inch diameter second aperture 22 is provided in the center of base 16 to enable attractor 10 to be attached to a fishing hook (not shown).

Apex 18 comprises a pair of lateral breaks or bends 24, 26 that bend apex 18 out of plane 14 of body portion 10. The first bend 24 bends apex 18 out of plane 14. The second bend 26 bends apex 18 into a second plane 28 parallel to plane 14. In addition, each of the opposed ends 30, 32 of base 16 is bent out of plane 14 in opposite directions. End 30 is bent along parallel lines 34, 36, and end 32 is bent along parallel lines 38, 40, as shown in FIGS. 1 and 2. Bent ends 30, 32 in effect are vanes that cause attractor 10 to rotate as it moves through water. Bends 24 and 26 cause attractor 10 to oscillate longitudinally along centerline 42 as attractor 10 is moved through water.

A third opening 44 is positioned centrally of attractor 10 in plane 14. Third opening 44 is substantially larger in diameter than either of the apertures 20, 22. In the case of a seven and one-half inch attractor, opening 44 is desirably made two inches in diameter. In the case of a five and one-half inch long attractor, opening 44 is desirably made one and three-quarter inches in diameter.

Body portion 12 is desirably made of 0.118 inch thick polyethylene terephthalate glycol-modified transparent plastic, sold as "Comco P.E.T.G.", and available, for example, in a variety of thicknesses from Spartech Plastics, McMinnville, Oreg.

I apply layers 46, 48 of holographic tape to each side of body portion 12 to provide a flashing appearance underwater. A suitable holographic tape 46, 48, having a pressure sensitive adhesive backing, is obtainable in a variety of colors and designs from WTP, Inc., Coloma, Mich., as its Model 121.

A synthetic plastic film 50 produces the actual sound. A very desirable film is "Sophisti Wrap", obtainable from Cindus Corp., Cinti, Ohio, as its silver "Sophisti Wrap", No. 4117. Mylar® polyester, obtainable from DuPont Corporation, Wilmington, Del., may also be used.

An additional transverse oriented layer of holographic tape (not shown) may be applied to the base portion 16 of body portion 12 if additional attractiveness is desired. Some fishermen have found that such an additional strip, blood red in color, is very attractive to some breeds of fish. Also, lure eyes 54, 56, 58, in red/black colors, may be applied as shown in FIGS. 1 and 2. These seem to attract fish also. Suitable lure eyes may also be obtained from WTP, Inc., Coloma, Mich., as its product 6½ EY No. 25.

If body portion 12 has a two inch diameter central opening 44, I first cut a corresponding two inch diameter hole in each of holographic tape layers 46, 48. I then cut two-and-three-eighth inch diameter round pieces 52 from the film chosen, for example "Sophisti Wrap". A piece 52 of film 50 is then applied to holographic tape layer 46 such that a uniform three-sixteenth inch margin is obtained. Layer 46, together with the adhered round piece 52, is then applied to one side of body portion 12, as shown in FIGS. 1 and 3. The margins of piece 52 are thus effectively sandwiched between layer 46 and the one side of body portion 12. The other layer 48 of holographic tape is then applied to the other side of body portion 12, as shown in FIGS. 2 and 3.

Piece 52 of film 50, being flat and covering opening 44, is then stretched to create a dome 51 by running a finger around its edge. Alternately as shown in FIG. 4, I can use a dowel 53, of slightly smaller diameter than opening 44 and having a suitably rounded end 55, to create the dome 51 that vibrates (see the arrows in FIG. 3) to produce the underwater noise or sound. This provides attractor 10 with the ability to generate the underwater sound that attracts fish so much better than has ever been done before.

FIGS. 5–8 illustrate other shapes that may be used for opening 44. However, I do not wish to limit the scope of my invention to the shapes of the openings shown.

My first offer for sale of my improved fish attractor was made in March 2002. I have sold thousands of them in the relatively short time since then. The United States Supreme Court stated "In the law of patents it is the last step that wins." The Barbed Wire Patent, 143 U.S. Pat. No. 275, 283 (1892). I believe that this last step has provided the very best fish attractor available to fishermen.

While I have described my invention in considerable detail, I do not wish to be limited to the particular embodiment shown and described. It is thus my intention to cover hereby all novel adaptations, modifications and arrangements of my invention that come within the practice of those skilled in the art to which the invention relates.

I claim:

1. In a fish attractor adapted to be attached to the end of a fishing line, the fish attractor comprising a generally planar body portion, the body portion comprising a plane having a base and an apex, the apex comprising a first centrally positioned aperture for attachment to the end of a fishing line, the base comprising a second centrally positioned aperture for attachment to a fishing hook, each of opposed ends of the base being bent out of the plane of the body portion in opposed directions to provide a pair of vanes to cause the attractor to rotate as it moves through water, the improvement comprising:

a third opening positioned generally centrally in the body portion, the third opening being substantially larger than the first and second apertures: and a sheet of flexible synthetic plastic film attached to the body portion and covering the third opening, whereby the plastic film is adapted to vibrate and to cause a sound as the attractor moves through water, the third opening being a circular opening and the sheet of plastic film being circular.

2. The fish attractor of claim 1, wherein the body portion comprises transparent plastic.

3. The fish attractor of claim 1, further comprising at least one layer of holographic tape adhered to at least one side of the body portion, the at least one layer of holographic tape comprising an opening corresponding to the third opening in the body portion.

4. The fish attractor of claim 3, wherein the sheet of flexible synthetic plastic film comprises a piece of plastic film corresponding to the opening in the at least one layer of holographic tape, the piece of plastic film having exterior dimensions greater than the opening in the at least one layer of holographic tape, the edges of the piece of plastic film being adhered to the at least one layer of holographic tape around the opening in the at least one layer of holographic tape, whereby the sheet of plastic film is sandwiched between the body portion and the at least one layer of holographic tape.

5. The fish attractor of claim 4, wherein the piece of flexible synthetic plastic film is stretched to provide a dome that vibrates and produces noise as the attractor moves through water.

6. The fish attractor of claim 1, wherein the apex of the body portion comprises at least one apex positioned bend, the at least one apex positioned bend bending the apex out of the plane of the body portion, wherein the at least one apex positioned bend provides the attractor with a longitudinal oscillatory motion as the attractor moves through water.

7. A fish attractor adapted to be attached to the end of a fishing line, the attractor comprising:

a generally planar body portion comprising transparent plastic, the body portion comprising a plane having an apex and a base, the apex comprising at least one apex positioned bend, the at least one apex positioned bend bending the apex out of the plane of the body portion, the at least one apex positioned bend providing the attractor with a longitudinal oscillatory motion as the attractor moves through water, the apex further comprising a first centrally positioned aperture for attachment to the end of a fishing line, the base comprising a second centrally positioned aperture for attachment to a fishing hook, each of opposed ends of the base being bent out of the plane of the body portion in opposed directions to provide the attractor with a pair of vanes to cause the attractor to rotate as the attractor moves through water;

a third opening having a circular shape positioned generally centrally in the plane of the body portion, the third opening having a diameter substantially larger than the first and second apertures;

at least one layer of holographic tape adhered to at least one side of the plane of the body portion, the at least one layer of holographic tape comprising a circular opening corresponding to the third opening in the plane of the body portion; and a circular piece of plastic film corresponding to the circular opening in the at least one layer of holographic tape, the diameter of the circular piece of plastic film being greater than the opening in the at least one layer of holographic tape, the edges of the piece of plastic film being adhered to the at least one layer of holographic tape around the opening therein, whereby the piece of plastic film is sandwiched between the plane of the body portion and the at least one layer of holographic tape, the piece of plastic film being stretched to provide a dome that vibrates and produces noise as the attractor moves through water.

8. The fish attractor of claim 7, wherein the apex of the body portion comprises a pair of apex positioned bends, a first apex positioned bend bending the apex out of the plane of the body portion, and a second apex positioned bend bending the apex into a second plane parallel to the plane of the body portion.

9. The fish attractor of claim 7, wherein the body portion comprises a generally triangular planar body portion.

* * * * *